US006993512B2

(12) United States Patent
McClanahan

(10) Patent No.: US 6,993,512 B2
(45) Date of Patent: Jan. 31, 2006

(54) SYSTEM AND METHOD FOR CONVERTING A COLOR FORMULA USING AN ARTIFICIAL INTELLIGENCE BASED CONVERSION MODEL

(75) Inventor: Craig J. McClanahan, Bowling Green, OH (US)

(73) Assignee: BASF Corporation, Southfield, MI (US)

( * ) Notice: Subject to any disclaimer, the term of this patent is extended or adjusted under 35 U.S.C. 154(b) by 157 days.

(21) Appl. No.: 09/874,698

(22) Filed: Jun. 5, 2001

(65) Prior Publication Data

US 2002/0184167 A1   Dec. 5, 2002

(51) Int. Cl.
*G06F 15/18*   (2006.01)

(52) U.S. Cl. .............................. 706/12; 706/15; 706/16
(58) Field of Classification Search .................. 706/12, 706/15, 16
See application file for complete search history.

(56) References Cited

U.S. PATENT DOCUMENTS

| | | | |
|---|---|---|---|
| 5,386,496 A | 1/1995 | Arai et al. ..................... 706/17 |
| 5,410,637 A | 4/1995 | Kern et al. ..................... 706/52 |
| 5,546,195 A | 8/1996 | Arai ........................... 358/518 |
| 5,548,697 A | 8/1996 | Zortea |
| 5,559,604 A | 9/1996 | Arai ........................... 356/402 |
| 5,577,178 A | 11/1996 | Curry et al. ................. 345/604 |
| 5,579,031 A | 11/1996 | Liang .......................... 345/604 |
| 5,583,642 A | 12/1996 | Nakazono |
| 5,590,251 A | 12/1996 | Takagi |
| 5,680,333 A | 10/1997 | Jansson .......................... 703/6 |
| 5,687,000 A | 11/1997 | Nakaoka ..................... 358/296 |
| 5,729,360 A | 3/1998 | Kita et al. ................... 358/500 |
| 5,761,070 A | 6/1998 | Conners et al. ............. 700/223 |
| 5,771,311 A | 6/1998 | Arai ............................ 382/162 |
| 5,774,230 A | 6/1998 | Goto ........................... 382/162 |
| 5,798,943 A | 8/1998 | Cook et al. .................. 382/162 |
| 5,808,621 A | 9/1998 | Sundaresan |
| 5,864,834 A | 1/1999 | Arai ............................ 706/16 |
| 5,899,605 A | 5/1999 | Caruthers, Jr. et al. ..... 399/223 |
| 5,929,906 A | 7/1999 | Arai et al. ................ 348/223.1 |
| 5,943,663 A | 8/1999 | Mouradian |
| 6,088,475 A | 7/2000 | Nagashima et al. ......... 382/162 |
| 6,459,425 B1 | 10/2002 | Holub et al. |
| 6,804,390 B2 | 10/2004 | McClanahan |

(Continued)

FOREIGN PATENT DOCUMENTS

EP           484 564        11/1990

(Continued)

OTHER PUBLICATIONS

Satoshi Abe; A Neural Network Approach for RGB to YMCK Color Conversion; Aug. 22-26, 1994; IEEE; TEN-CON '94, Proceedings; 6-9.*

(Continued)

*Primary Examiner*—Joseph P. Hirl

(57) ABSTRACT

A system and method for converting a color formula from compositions such as paints, pigments, or dye formulations, is provided. The input to the system is a first color formula. The system includes an input device for entering a plurality of color formula values and an artificial intelligence conversion model coupled to the input device. The conversion model produces an output signal for communicating a second color formula. The artificial intelligence model may be embodied in a neural network. More specifically, the conversion model may be a back propagation neural network.

22 Claims, 2 Drawing Sheets

U.S. PATENT DOCUMENTS

| | | |
|---|---|---|
| 2002/0052862 A1 | 5/2002 | Scott et al. |
| 2002/0106121 A1 | 8/2002 | McClanahan |
| 2002/0156917 A1 | 10/2002 | Nye |
| 2002/0184171 A1 | 12/2002 | McClanahan |
| 2003/0110101 A1 | 6/2003 | Friel et al. |
| 2003/0163262 A1 | 8/2003 | Corrigan et al. |
| 2004/0073526 A1 | 4/2004 | McClanahan |

FOREIGN PATENT DOCUMENTS

| | | |
|---|---|---|
| EP | 0 946 051 A2 | 9/1999 |
| EP | 08 22 396 B1 | 5/2000 |
| GB | 1056358 | 10/1963 |
| JP | 404235322 A * | 8/1992 |
| WO | WO 92/05470 | 4/1992 |
| WO | WO 94/14039 | 6/1994 |
| WO | WO 98/12520 | 3/1998 |
| WO | WO 99/01982 | 1/1999 |
| WO | WO 00 /65847 | 11/2000 |

OTHER PUBLICATIONS

BASF Corporation, et al. International Search Report PCT/US02/14091 International filing date Mar. 5, 2002.

BASF Corporation, et al. International Search Report PCT/US02/14092 International filing date Mar. 5, 2002.

PCT International Search Report, International Application No. PCT/US02/14023 filed May 3, 2002.

Pending U.S. Appl. No. 09/874,700 filed Jun. 5, 2001, entitled "Business Process for Color Management and Solution Distribution".

Pending U.S. Appl. No. 09/874,699 filed Jun. 5, 2001, entitled "Artificial Intelligence Based Technique for Developing Color Tolerances".

Pending U.S. Appl. No. 10/206,556 filed Jul. 26, 2002, entitled "Electronic Image Displays of Automotive Color Information".

Pending U.S. Appl. No. 10/065,705 filed Nov. 12, 2002, entitled "Electronic Display of Automotive Colors".

* cited by examiner

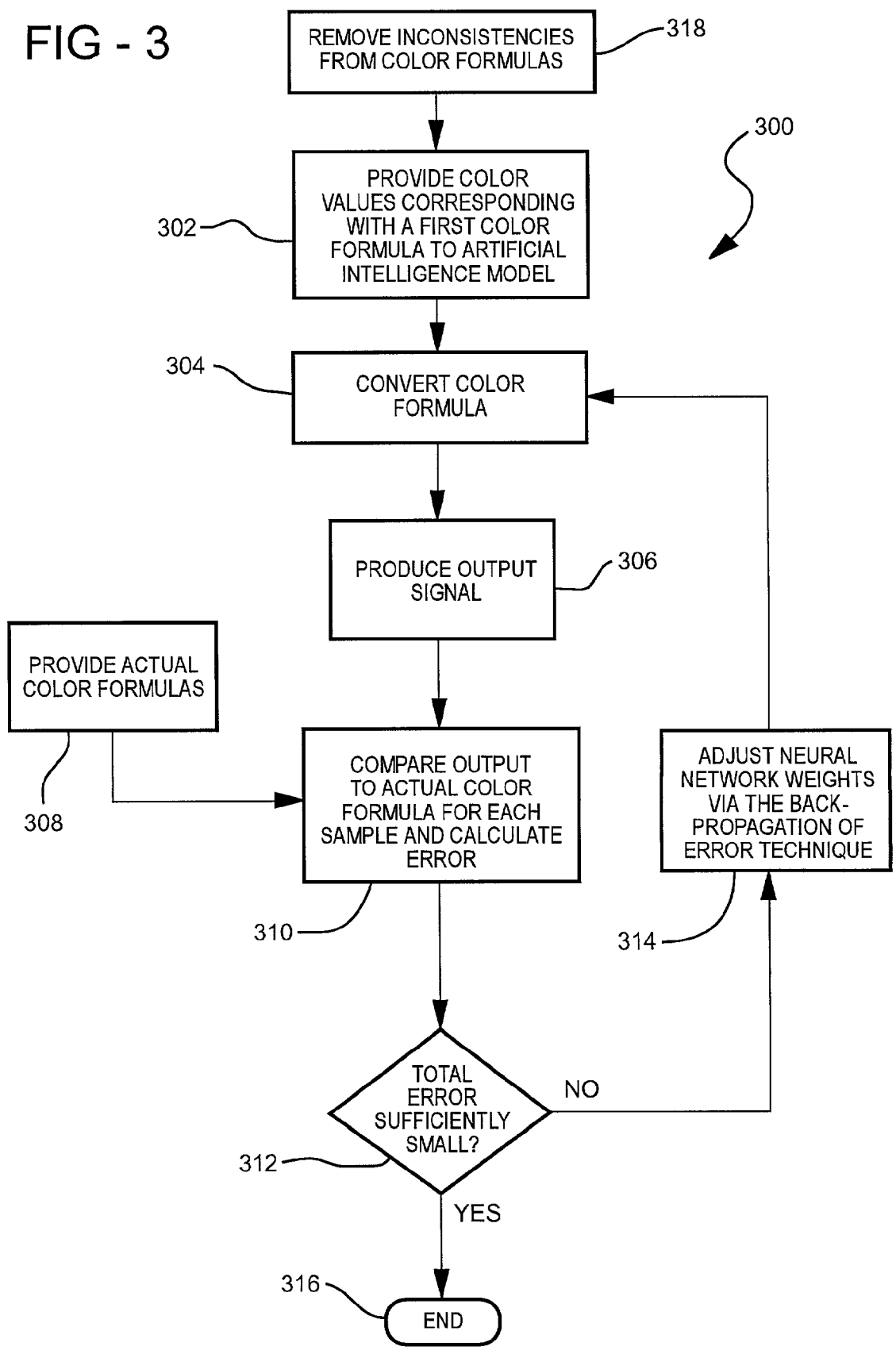

US 6,993,512 B2

SYSTEM AND METHOD FOR CONVERTING A COLOR FORMULA USING AN ARTIFICIAL INTELLIGENCE BASED CONVERSION MODEL

BACKGROUND OF THE INVENTION

1. Field of the Invention

The present invention relates generally to converting a color formula in one paint or color system to a formula in another paint or color system, and more particularly, to a method and system for converting a color formula using artificial intelligence.

2. Description of the Related Art

Products today are offered to consumers in a wide variety of colors. Consumer products may be colored by means of colorants, dye or paint. Color matching is required in a variety of areas, including textiles, plastics, various synthetic materials, prosthetics, dental applications, and paint applications, due to the many variations in color, due to the wide variations in shades and hues of any given color and color variations in an article. The actual color produced in a given article may vary due to a number of factors. For example, textile colors vary according to fiber composition. Colorants for plastic vary according to the plastic composition. Painted articles vary in color depending on any number of factors, such as paint composition, variations in the paint application process, including application method, film thickness, drying technique and number of layers. An important application for color matching is in the area of automotive color matching. Frequent uses for color matching in automotive paint occur in matching the same color from different batches or matching similar colors from different manufacturers. Additionally, there is a requirement for color matching refinish paint to an OEM (original equipment manufacture) color when a vehicle body panels are damaged and require repainting.

A paint manufacturer supplies one or more paint formulations for the original paint color to refinish paint shops. By supplying a plurality of formulations or variants for a particular color, the paint manufacturer accounts for those factors which affect the actual color. Matching of dyes or colorants for other applications is also done through formulations for a particular color. Typically, the formulations for a particular color are distributed on paper, microfiche, and/or compact disks (CD). A color tool, composed of swatches of the variants for each color may also be produced and delivered to each customer. The customer must select a formulation most closely matching the existing color of the article. This is typically done visually, i.e., by comparing swatches of paint or color to the part or in the case of paint, spraying a test piece with each formulation.

Different formulations are derived from actual data gathered by inspectors at various locations, e.g., the textile, plastic or automobile manufacturer or vehicle distribution point. The inspectors take color measurement readings from articles of a particular color. These readings are used to develop color solutions, i.e., different formulations for the same color.

There are several disadvantages to the present method of color matching. Conventional color laboratories that use human analysis to determine color matching require significant numbers of people, equipment and materials for identifying pigments and locating a close match from a database. In some cases, an existing formula may provide a close match. In other cases, the formula must be adjusted, mixed, applied and compared to a standard. These steps are repeated until a suitably close match is found. In other cases, no match is found and a formula must be developed from scratch. Correction of the formula requires a highly skilled technician proficient in the interaction of light with several different pigments.

Moreover, traditional computer software that assists a technician has several disadvantages. Traditional computer software has not proven to be very effective on colors containing "effect pigments." This software is typically based on a physical model of the interaction between illuminating light and the colorant or coating. These models involve complex physics and do not account for all aspects of the phenomena. A traditional approach is to use a model based on the work of Kubleka-Munk or modifications thereof. The model is difficult to employ with data obtained from multi-angle color measuring devices. One particular difficulty is handling specular reflection that occurs near the gloss angle. Another deficiency of the Kubleka-Munk based models is that only binary or ternary pigment mixtures are used to obtain the constants of the model. Thus, the model may not properly account for the complexities of the multiple interactions prevalent in many paint and colorant recipes.

The present invention is directed to solving one or more of the problems identified above.

SUMMARY OF THE INVENTION AND ADVANTAGES

A color formulation is comprised of a collection of ingredients and the corresponding amount. Included in the ingredient list are pigment dispersions that impart the color characteristics to the formulation. Color samples having various color formulations over different colorant or paint lines may be converted from one colorant or paint line to another according to the composition of the original formula. Historically, these conversions have been performed by determining conversion factors which when applied to an ingredient amount in one paint or colorant system gives the amount of a corresponding ingredient in the secondary system. These conversion factors where determined by calculating the ratio of the pigment concentration in the secondary system ingredient to the pigment concentration in the primary system ingredient.

In one aspect of the present invention, a system for converting a first color formula using an artificial intelligence conversion model, is provided. The model is embodied in a neural network and, in particular, a feed-forward back propagation neural network. The first color formulation is expressed as list of ingredients and amounts in a first system. The neural network is trained using this list for each formulation and corresponding formulations in the second system. The neural network includes an input layer having nodes for receiving input data related to color recipes. Weighted connections connect to the nodes of the input layer and have coefficients for weighting the input data. An output layer having nodes is either directly or indirectly connected to the weighted connections. The output layer generates output data that is related to the color formulation in the secondary system. The data of the input layer and the data from the output layer are interrelated through the neural network's nonlinear relationship.

Neural networks have several advantages over conventional logic-based expert systems or computational schemes. Neural networks are adaptive and provide parallel computing. Further, because neural responses are non-linear, a neural network is a non-linear device, which is critical when applied to nonlinear problems. Moreover, systems incorporating neural networks are fault tolerant because the information is distributed throughout the network. Thus, system performance is not catastrophically impaired if a processor experiences a fault.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a block diagram depicting the training of the color formula conversion neural network of FIG. 2, according to an embodiment of the present invention.

DETAILED DESCRIPTION OF THE PREFERRED EMBODIMENT

Referring to the Figs., wherein like numerals indicate like or corresponding parts throughout the several views, a system 100 and method 300 for converting a color formula, such as paint, pigments, or dye formulations is provided.

For example, where a paint formulation is used in the repair of an automobile body panel, the input to the system is the formulation in the primary paint system.

Figure 1:
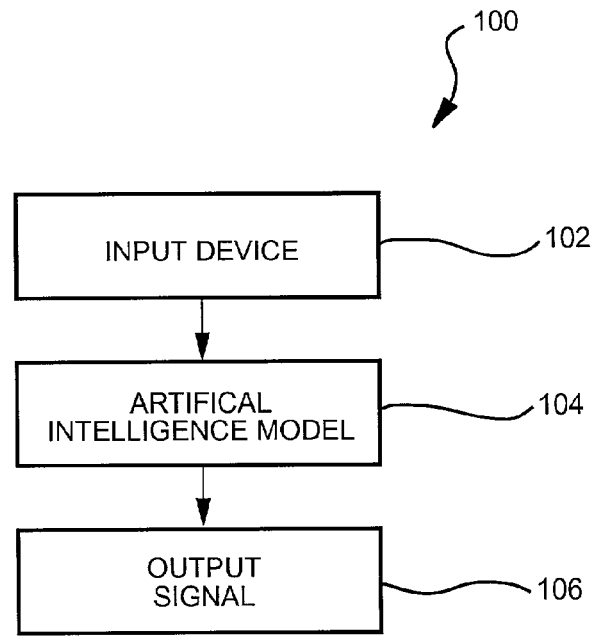
FIG. 1 is a block diagram of a system for converting a color formula having an artificial intelligence model, according to an embodiment of the present invention.

With specific reference to FIG. 1, the system 100 includes an input device 102 for entering a first color formula. Preferably, the first color formula is composed of a plurality of ingredients.

Preferably, the system 100 is embodied in a computer program run on a general purpose computer (not shown). The input device 102 may be embodied in a user interface for inputting the formulation, such as a keyboard, mouse and/or graphical user interface. Furthermore, the input device 102 may be embodied in an element of a computer system so as to receive the formulation as input from another element of the computer system, such as a computer database, an electronic mail file or other suitable element of the computer system (see below).

The system 100 of the present invention further includes an artificial intelligence conversion model 104 coupled to the input device 102. The conversion model 104 produces an output signal 106 for communicating a second color formula. The artificial intelligence conversion model 104 may be embodied in a neural network. More specifically, the conversion model 104 may be a back propagation neural network or any other suitable neural network. The output signal 106 may be embodied in a second color formula format, a predicted color formula format or any other suitable format.

Figure 2:
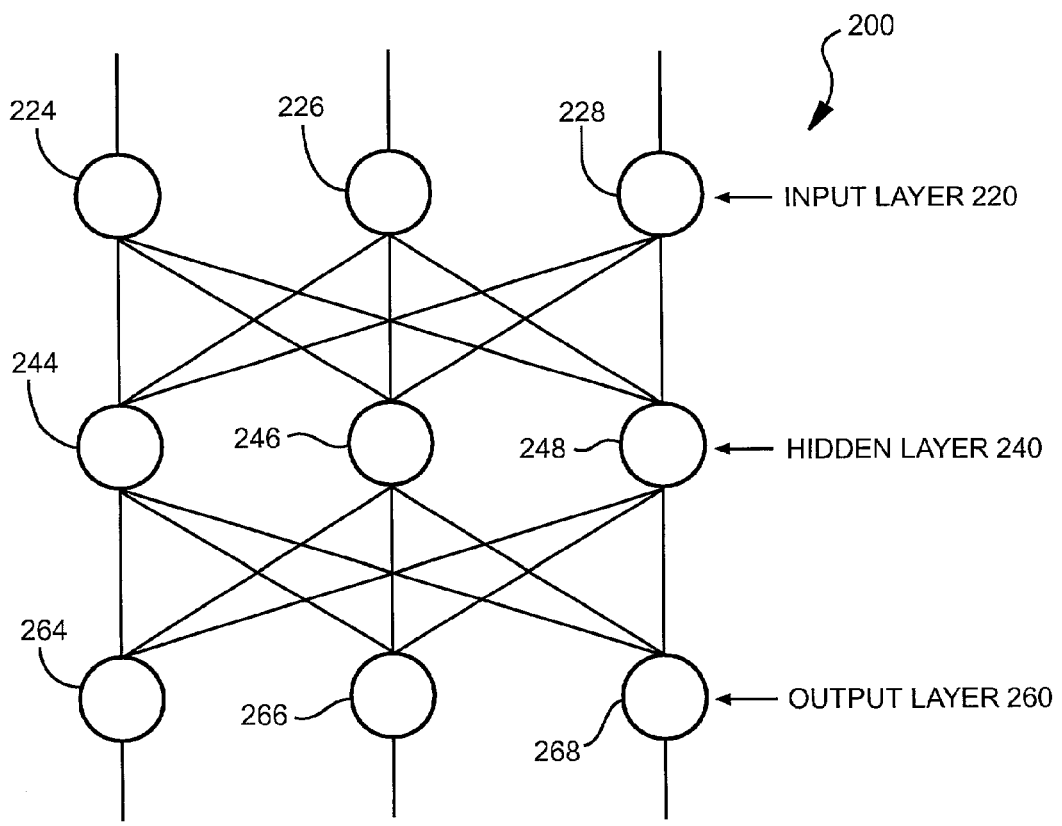
FIG. 2 is a diagram depicting a neural network for use in the artificial intelligence model of FIG. 1, according to an embodiment of the present invention.

Referring to FIG. 2, an artificial neural network is generally shown at 200. Artificial neural networks 200 are computing systems that model vertebrate brain structure and processes. Artificial neural network techniques are a member of a group of methods that fall under the umbrella of artificial intelligence. Artificial intelligence is commonly associated with logic rule-based expert systems where the rule hierarchies used are reasoned from human knowledge. In contrast, artificial neural networks 200 are self-trained based on experience acquired through data compilation and computation. Thus, artificial intelligence utilizing neural networks 200 is particularly useful in conjunction with complex systems or phenomena where the analysis is complicated, and deriving a model from human knowledge for use in a conventional expert system is a daunting task.

Although neural networks differ in geometry, activation function and training mechanics, they are typically organized into at least three layers. The first layer is an input layer 220 having one or more input nodes 224, 226, 228. The second layer is an output layer 260 having one or more output nodes 264, 266, 268. Each output node 264, 266, 268 corresponds with an input node 224, 226, 228. Between the inner and outer layers, there are one or more hidden layers 240, each having one or more hidden nodes 244, 246, 248 corresponding to an input node and output node pair 224, 264, 226, 266, 228, 268. Each input variable is associated with an input node 224, 226, 228 and each output variable is associated with an output node 264, 266, 268. Within the neural network 200, data flows in only one direction, such that each node 224, 226, 228, 244, 246, 266, 268 only sends a signal to one or more nodes and receives no feedback.

The enabling power of a neural network 200 is its connectivity, or the connections between the various nodes 224, 226, 228, 244, 246, 266, 268. (A configuration technique modeled after the structure of the human brain.) Moreover, because the network is structured, or connected, in such a way as to provide parallel processing (where each node 224, 226, 228, 244, 246, 266, 268 has connections with other nodes 224, 226, 228, 244, 246, 266, 268), it is extremely efficient at acquiring and storing experiential knowledge and, then recalling and using that knowledge. More specifically, a node 224, 226, 228, 244, 246, 266, 268 receives input values, processes them and provides an output. The processing step includes summing the inputs, adding a bias value and submitting this total input to an activation function which limits the magnitude of the output. The connections between the various nodes 224, 226, 228, 244, 246, 266, 268 are weighted. An output sent from one node 224, 226, 228, 244, 246, 266, 268 to another is multiplied by the weighting factor associated between those two particular nodes 224, 226, 228, 244, 246, 266, 268. The weighting factor represents the knowledge of the system. The system continues to accumulate knowledge and adjust the weighting factor in accordance with training and the further acquisition of knowledge by the network 200. Consequently, the output of the network 200 agrees with the experience of the network 200.

The neural network 104 of the subject invention is self-trained using formulations in one paint system and the corresponding historical formulations in a secondary paint system. With reference to FIG. 3, a method of training the neural network 104 is illustrated. There are two different types of training (learning) for a neural network 104. In supervised training (or external training), the network 104 is taught to match its output to external targets using data having input and output pairs. In supervised training, the weighting factors are typically modified using a back-propagation method of learning where the output error is propagated back through the network 104. In unsupervised training (or internal training), the input objects are mapped to an output space according to an internal criteria.

The preferred embodiment of the subject invention neural network 104 is a back propagation neural network 104. In a first process block 302, the first set color formula is input into the neural network 104. In a second process block 304, the neural network 104 converts the first color formula into a second color formula. In a third process block 306, the neural network 104 produces an output signal 106. The output signal 106 is a predicted color formula. In process block 308, an actual color formula is input. In the process block 310, the actual color formula is input and compared to the output signal 106 of the neural network 104, wherein the difference is an error calculation. In a decision block 312, if the error calculation is sufficiently small, no further action is taken in process block 316. The size of the acceptable error calculation may be determined by experience or be related to an estimation of the uncertainty associated with the formulations. For example, if the uncertainty in the ingredient amount in each formula is Y, and there are on average ten ingredients per formula and the training set consists of 1,000 formula pairs, then the total or maximum error could be expressed as of Y×10×1,000. However, where the error calculation is not sufficiently small, the plurality of weighted factors are adjusted based on the output signal 106 in process block 314.

In another aspect of the present invention, in process block 318, there is a processing of the training data set prior to training of the network. The processing is used to remove inconsistencies or errors in the formulations. An example of an inconsistency is a situation where the historical color formulation in the secondary paint system contains ingredients that would not typically be used in the formulation based on an analysis of the corresponding formulation in the primary paint system. Such inconsistencies may be a result of variability or errors in the color matching process. The preprocessing of the training set may be performed by manual inspection, computational/statistical analysis or via artificial intelligence based techniques.

What is claimed is:

1. A computer-based system for converting a color formula corresponding to a color, comprising:
    an input device for receiving a first color formula corresponding to the color in a primary color system, the primary color system composed of a first set of ingredients, wherein the first color formula is comprised of a plurality of amounts of the first set of ingredients with the first set of ingredients having pigments that impart color characteristics to the first color formula; and
    an artificial intelligence conversion model coupled to the input device for converting the first color formula into a second color formula, the second color formula corresponding to the color in a secondary color system, the secondary color system, which is different than the primary color system, is composed of a second set of ingredients, the second color formula is comprised of a plurality of amounts of the second set of ingredients with the second set of ingredients having pigments that impart color characteristics to the second color formula, and the artificial intelligence conversion model producing an output signal corresponding to the second color formula.

2. A computer-based system, as set forth in claim 1, wherein the artificial intelligence conversion model is a neural network.

3. A computer based system, as set forth in claim 2, wherein the neural network is a back propagation neural network.

4. A computer-based system, as set forth in claim 2, wherein the neural network includes an input layer having a plurality of input nodes for receiving plurality of formulation ingredient amounts and an output layer having a plurality of output nodes and one of the plurality of input nodes corresponds with one of the plurality of output nodes.

5. A computer-based system, as set forth in claim 4, wherein the neural network includes a hidden layer having a plurality of weighted factors wherein one of the plurality of weighted factors corresponds to one of the plurality of input nodes and a corresponding output node.

6. A computer-based system, as set forth in claim 5, wherein each of the plurality of weighted factors is determined as a function of the first color formula.

7. A computer-based system, as set forth in claim 5, wherein the plurality of weighted factors determine the contribution of a plurality of color formulation values of the first color formula to the output signal.

8. A computer-based system, as set forth in claim 5, wherein the plurality of weighted factors are adjusted as a function of the output signal.

9. A computer-based system, as set forth in claim 5, wherein the output layer produces the output signal and wherein the second color formula of the output signal is further defined as a predicted color formula.

10. A computer-based system, as set forth in claim 9, including a comparator for comparing the predicted color formula from the output layer to the actual color formula and providing feedback to the neural network.

11. A computer-based system, as set forth in claim 10, wherein the plurality of weighted factors are adjusted as a function of the feedback received by the neural network from the comparator.

12. A neural network for converting a color formula corresponding to a color, comprising:
    an input layer having a plurality of input nodes for receiving a plurality of color formulation values, wherein the plurality of color formulation values correspond with a first color formula of the color in a primary color system, the primary color system composed of a first set of ingredients, each color formulation value being indicative of an amount of a corresponding ingredient in the primary color system with the first set of ingredients having pigments that impart color characteristics to the first color formula; and
    an output layer having a plurality of output nodes wherein one of the plurality of input nodes corresponds with one of the plurality of output nodes;
    wherein the output layer produces an output signal, the output signal being indicative of a second plurality of color formulation values, wherein the second plurality of color formulation values correspond with a second color formula of the color in a secondary color system, the secondary color system, which is different than the primary color system, is composed of a second set of ingredients, each secondary color formulation value being indicative of an amount of a corresponding ingredient in the secondary color system with the second set of ingredients having pigments that impart color characteristics to the second color formula, and the output signal being the second color formula.

13. A neural network, as set forth in claim 12, wherein the neural network is a feed-forward back propagation neural network.

14. A neural network, as set forth in claim 12, including a hidden layer having a plurality of weighted factors wherein one of the plurality of weighted factors corresponds to one of the plurality of input nodes and the corresponding one of the plurality of output nodes.

15. A neural network, as set forth in claim 14, wherein each of the plurality of weighted factors is determined as a function of the first color formula.

16. A neural network, as set forth in claim 14, wherein the plurality of weighted factors determine the contribution of the plurality of color formulation values of the first color formula to the output signal.

17. A neural network, as set forth in claim 14, wherein the plurality of weighted factors are adjusted as a function of the output signal.

18. A neural network, as set forth in claim 14, wherein the second color formula of the output signal is further defined as a predicted color formula.

19. A neural network, as set forth in claim 18, including a comparator for comparing the predicted color formula from the output layer to an actual color formula and providing feedback to the neural network.

20. A neural network, as set forth in claim 19, wherein the plurality of weighted factors are adjusted as a function of the feedback received by the neural network from the comparator.

21. A neural network, as set forth in claim 20, wherein the plurality of weighted factors are adjusted as a function of the feedback received by the neural network.

22. A method for training an artificial model of a computer based system for converting a color formula corresponding to a color, the model including a neural network having an input layer, a hidden layer, and an output layer, comprising the steps of:

providing a plurality of sets of color formulation values to the input layer, wherein each of the plurality of color formulation values corresponds with a first color formula, the first color formula corresponding to the color in a primary color system, the primary color system composed of a first set of ingredients, each color formulation value being indicative of an amount of a corresponding ingredient with the first set of ingredients having pigments that impart color characteristics to the first color formula;

applying a weighted factor to the plurality of sets of color values in the hidden layer to produce an output signal;

providing the output signal to a comparator, the output signal being indicative of a second plurality of color formulation values, wherein the second plurality of color formulation values correspond with a second color formula of the color in a secondary color system, the secondary color system, which is different than the primary color system, is composed of a second set of ingredients, each secondary color formulation value being indicative of an amount of a corresponding ingredient in the secondary color system with the second set of ingredients having pigments that impart color characteristics to the second color formula;

providing an actual formula to the comparator for comparing the actual formula to the output signal and responsively producing an error calculation; and adjusting the weighted factor as a function of the output signal if the error calculation is not sufficiently small.

* * * * *